United States Patent
Robinson (10) Patent No.: US 8,131,953 B2
(45) Date of Patent: Mar. 6, 2012

(54) TRACKING STORE ORDERING HAZARDS IN AN OUT-OF-ORDER STORE QUEUE

(75) Inventor: Eric F. Robinson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 11/958,328

(22) Filed: Dec. 17, 2007

(65) Prior Publication Data

US 2009/0157944 A1 Jun. 18, 2009

(51) Int. Cl.
G06F 12/00 (2006.01)
G06F 9/312 (2006.01)
(52) U.S. Cl. .................. 711/156; 711/E12.001; 712/216
(58) Field of Classification Search .................. 711/156, 711/E12.001; 712/216
See application file for complete search history.

(56) References Cited

U.S. PATENT DOCUMENTS

| | | | |
|---|---|---|---|
| 5,465,336 A | 11/1995 | Imai et al. | |
| 5,621,896 A | 4/1997 | Burgess et al. | |
| 5,809,530 A | 9/1998 | Samra et al. | |
| 6,011,908 A | 1/2000 | Wing et al. | |
| 6,021,468 A | 2/2000 | Arimilli et al. | |
| 6,163,821 A | 12/2000 | Keller et al. | |
| 6,237,067 B1 | 5/2001 | Eberhard et al. | |
| 6,393,536 B1 | 5/2002 | Hughes | |
| 6,460,133 B1 | 10/2002 | Nunez et al. | |
| 6,481,251 B1 | 11/2002 | Meier et al. | |
| 6,591,342 B1 | 7/2003 | Akkary et al. | |
| 6,877,077 B2 | 4/2005 | McGee et al. | |
| 6,963,967 B1 | 11/2005 | Guthrie et al. | |
| 7,003,648 B2 | 2/2006 | Chrysos et al. | |
| 7,089,364 B2 | 8/2006 | Arimilli et al. | |
| 7,467,256 B2 | 12/2008 | Jain et al. | |
| 7,689,813 B2 | 3/2010 | Caprioli et al. | |
| 2002/0056022 A1* | 5/2002 | Leung | 711/106 |
| 2003/0196035 A1* | 10/2003 | Akkary | 711/108 |
| 2003/0196075 A1 | 10/2003 | Akkary et al. | |
| 2005/0251622 A1 | 11/2005 | Arimilli et al. | |
| 2006/0129764 A1* | 6/2006 | Bellows et al. | 711/125 |
| 2006/0179226 A1 | 8/2006 | Guthrie et al. | |
| 2008/0082738 A1 | 4/2008 | Cypher et al. | |
| 2009/0157943 A1 | 6/2009 | Robinson | |
| 2009/0157944 A1 | 6/2009 | Robinson | |

OTHER PUBLICATIONS

USPTO office action for U.S. Appl. No. 11/958,328 dated Sep. 15, 2010.
USPTO Non-final office action dated May 11, 2011 regarding U.S. Appl. No. 11/958,318.
USPTO Non-final office action dated Sep. 15, 2010 regarding U.S. Appl. No. 11/958,318.
USPTO Final office action dated Jan. 10, 2011 regarding U.S. Appl. No. 11/958,318.
USPTO Notice of allowance dated Sep. 28, 2011 regarding U.S. Appl. No. 11/958,318.

* cited by examiner

Primary Examiner — Shane M Thomas
(74) Attorney, Agent, or Firm — Yee & Associates, P.C.; Yuanmin Cai (57) ABSTRACT

A method and system for processing data. In one embodiment, the method includes receiving a first store and receiving a second store subsequent to the first store. The method also includes generating a pointer that points to the last store that needs to retire before the second store retires, where the pointer is associated with the second store, and the last store that needs to retire is the first store.

20 Claims, 6 Drawing Sheets

TRACKING STORE ORDERING HAZARDS IN AN OUT-OF-ORDER STORE QUEUE

FIELD OF THE INVENTION

The present invention relates to computer systems, and more particularly to data processing.

RELATED CO-PENDING PATENT APPLICATIONS

The present invention is related to a co-pending U.S. application Ser. No. 11/958,318, filed on Dec. 17, 2007, and entitled "Tracking Load Store Ordering Hazards," which is herein incorporated by reference.

BACKGROUND OF THE INVENTION

A processor (also commonly referred to as a central processing unit (CPU)) is a component in a computer that executes instructions of a program. In general, processor instruction execution may be broken down into three main tasks: 1) loading (or reading) data into registers from memory (e.g., a cache); 2) performing arithmetic operations on the data; and 3) storing (or writing) the results of the arithmetic operations to memory or input/output (I/O).

Of the tasks above, the first task—loading data (where data that is loaded from memory referred to as a "load") into registers from memory—has the most impact on processor performance; as the second task cannot begin until the first task is complete. The third task—storing results (where data that is stored to memory is referred to as a "store") to memory or I/O—is the most flexible as to the latency of its completion. Thus, when both a load and a store simultaneously attempt to access a cache during the same processor execution cycle, the load is typically allowed access to the cache, while the store must wait for the next processor execution cycle. Accordingly, in a circumstance in which multiple loads need to access a cache, a store may have to wait a few processor execution cycles before being granted access to the cache. Stores are therefore typically stored in a queue (commonly referred to as a "store queue") while the stores wait for access to the cache.

In processor designs, a store queue can be a FIFO (First In, First Out) or a non-FIFO. Non FIFO store queues (also referred to as "out of order (OoO) store queues") permit younger (newer) stores to be retired (i.e., data associated with the store is written into cache) before older stores are retired. Out of order store queues introduce additional complexity relative to FIFO store queues, but typically yield higher performance. For example, if the retirement of a particular store needs to be delayed for some reason, an out of order store queue may retire a younger store as long as there is no data ordering dependency between the delayed store and the younger store.

In some situations, two stores may be going to the same (cache) address and therefore the two stores must be retired in a particular order with respect to each other. This creates a store ordering hazard, which may introduce data integrity problems if a younger store going to a given address is retired before an older store going to the same address. The two stores may still be retired out of order relative to other stores in the store queue. In an out-of-order case, the younger store sets a dependency vector bit to indicate a dependency with a corresponding older store. During each processor execution cycle, the store performs a reduction OR operation across its dependency vector bits; if any of the dependency vector bits is set (e.g., equal to 1), then the store must wait for the next processor execution cycle for retirement. In some situations, a particular store must wait for a plurality of older stores to retire before the store can be retired—e.g., a sync or a store that may be going to the same address as several other stores in the store queue. In such cases, a younger store sets a dependency vector bit for each older store that must be retired prior to the store. As the older stores are retired, the corresponding dependency vector bits are cleared, and when a reduction OR finds that no dependency vector bits are set, the store is eligible to be retired.

Each store queue entry typically includes a dependency vector field that includes dependency vector bits, which indicate dependencies of the store to other stores in the store queue. Each dependency vector bit corresponds to a particular entry in the store queue. Thus, for an 8-entry store queue, the dependency vector includes an array of 8 entries by 8 bits. While the dependency vector may be manageable for an 8 entry store queue, as the depth of the store queue increases, the storage associated with the dependency vectors increases with the square of the number of entries in the store queue. Larger dependency vectors require a larger number of latches, and these latches consume area and power.

Accordingly, what is needed is an improved method and system for processing data. The present invention addresses such a need.

SUMMARY OF THE INVENTION

A method for processing data is disclosed. In one embodiment, the method includes receiving a first store and receiving a second store subsequent to the first store. The method also includes generating a pointer that points to the last store that needs to retire before the second store retires, where the pointer is associated with the second store, and the last store that needs to retire is the first store. According to the method and system disclosed herein, embodiments are area and power efficient, and are also scalable.

DETAILED DESCRIPTION OF THE INVENTION

The present invention relates to computer systems, and more particularly to data processing. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for processing data is disclosed. The method includes receiving multiple stores. Each store is associated with a hazard pointer that points to the last store that needs to retire before the store can retire. Each store is also associated with a hazard valid indication that indicates if a hazard exists. A hazard exists when two or more stores are destined to the same address. As a result, a need for a dependency vector is eliminated. These "chains of stores" form linked lists based on address such that any two stores that need to be ordered with respect to each other are kept in the same linked list, and any two stores that do not have any dependencies relative to each other are kept in different linked lists. There is no limit on the number of linked lists because the resources needed to manage them are the same, regardless of whether there's a single list or multiple lists per store queue. Embodiments described herein take advantage of the relative rarity and blocking nature of synchronizing operations by placing a restriction on the processor such that once a synchronizing operation enters this store queue, no more stores from the same thread are allowed to enter the store queue until the synchronizing operation is retired. Furthermore, if the nature of the synchronizing operation is such that it blocks all threads, then no more stores at all may enter the store queue until this synchronizing operation is retired. If the store queue at any given moment were to be filled with stores destined to the same address, the series of pointers associated with those stores would form one large linked list. If the store queue contained a few store entries to one address and a few store entries to another address, the hazard pointers would form two independent linked lists. To more particularly describe the features of the present invention, refer now to the following description in conjunction with the accompanying figures.

Figure 1:
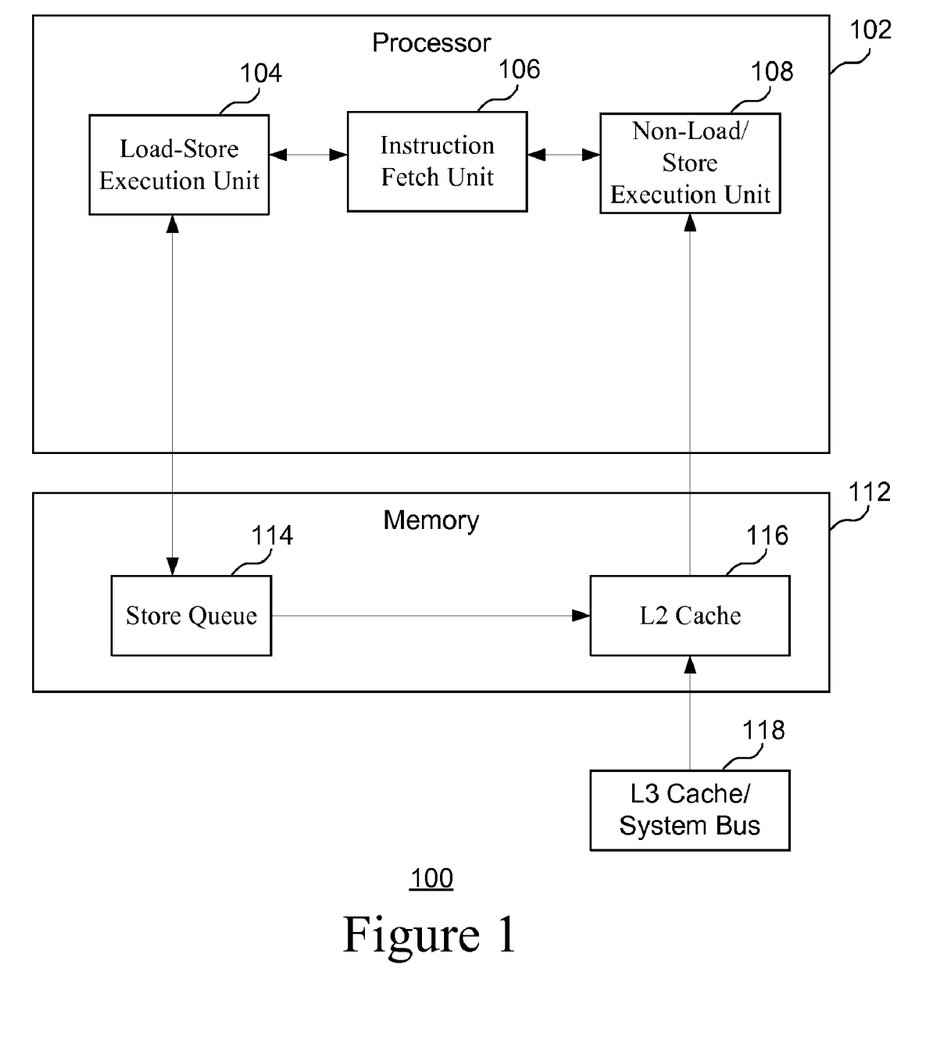
FIG. 1 is a high-level block diagram of a computer system 100 according to one embodiment of the present invention.

FIG. 1 is a high-level block diagram of a computer system 100 according to one embodiment of the present invention. As FIG. 1 shows, the computer system 100 includes a processor 102 that includes a load-store execution unit 104, an instruction fetch unit 106, a non-load/store execution unit 108. The computer system 100 also includes a memory 112 that includes a store queue 114 and an L2 cache 116. The computer system 100 also includes an L3 cache/system bus 118.

In operation, the processor 102 executes instructions of a program. The load/store execution unit 104 loads data ("loads") from memory (e.g., L2 cache 116) into registers in the non-load/store execution unit 108 where arithmetic operations are performed on the data based on instructions fetched and issued by the instruction fetch unit 106. The load-store execution unit 104 also stores the results ("stores") of the arithmetic operations to memory or input/output (I/O). When two stores are destined to the same address of the cache, the younger store needs to wait for the older store to retire before the younger store can retire. Accordingly, stores are held in the store queue 114 while the stores wait for access to the cache.

Figure 2:
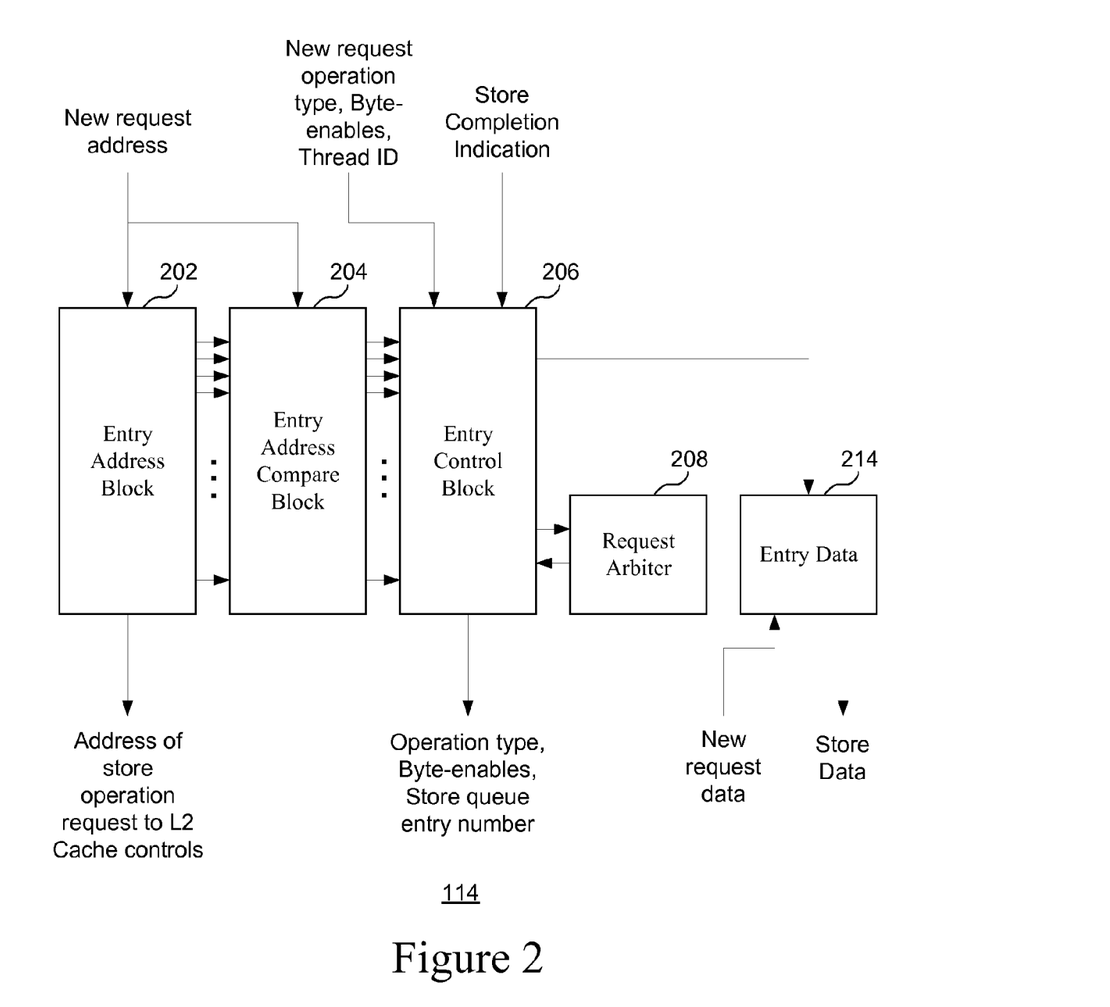
FIG. 2 is a block diagram of the store queue 114 of FIG. 1 according to one embodiment of the present invention.

FIG. 2 is a block diagram of the store queue 114 of FIG. 1 according to one embodiment of the present invention. As FIG. 2 shows, the store queue 114 includes an entry address block 202, entry address compare block 204, an entry control block 206, a request arbiter 208, and entry data 214.

Figure 3:
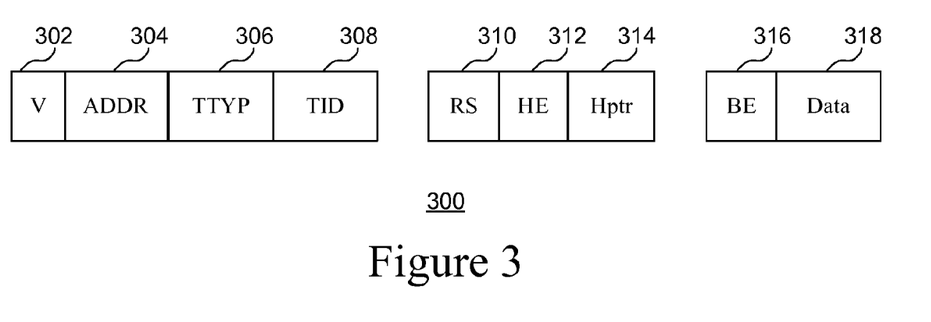
FIG. 3 is a block diagram of a store queue entry 300 in accordance with one embodiment of the present invention.

In one embodiment, entry address block 202 holds the addresses of all stores being held by the store queue 114 so that they may be compared against newly arriving stores in entry address compare block 204 to detect ordering hazards. Entry control block 206 controls the movement of data into and out of entry data block 214. In one embodiment, entry control block 206 uses the compare results from entry address compare block 204 and the control bits (e.g. operation type, byte-enables, thread ID) bus to set up and manage hazard tracking for store queue entries. Once an entry's ordering hazard resolves via the store completion indication from the L2 cache 116, entry control block 206 makes a retirement request for the entry. Request arbiter 208 selects an entry from among those making retirement requests to be the next entry to make a store queue write request to L2 cache 116. When a store queue entry makes its retirement request to the L2 cache 116, the request's address is provided by entry address block 202, the request's control bits (e.g. operation type, byte_enables, entry number, etc) are provided by entry control block 206, and the request data is provided by entry data 214. When the L2 returns a store completion indication to the store queue 114, the entry containing the completed store is marked invalid by entry control unit 206. FIG. 3 is a block diagram of a store queue entry 300 in accordance with one embodiment of the present invention. In one embodiment, the store queue entry 300 includes a valid bit field (V) 302 that indicates whether the store queue entry contains an unretired store, an address field (ADDR) 304 that contains the target address of the store, a command field (TTYP) 306 that indicates the type of the store (e.g., normal store, synchronizing store, etc.), and a thread ID field (TID) 308 that indicates the thread ID corresponding to the store.

In one embodiment, the store queue entry 300 also includes a recent store field (RS) 310 that indicates that the store is the most recent store, a hazard bit field (HE) 312 that indicates that a hazard exists. For example, if the HE bit is set, the store is not allowed to retire yet, and if the HE bit is cleared, the store is eligible to retire. In one embodiment, for new regular stores, if the RS is set it would be the most recent store for its cache line address, and the RS bits of all older stores for the same cache line address are cleared. In one embodiment, for regular stores, the HE 312 is set if there is already a store in the store queue 114 destined for the same memory address (e.g., same cache line). In one embodiment, for single-thread syncs and all-thread syncs, the HE bit is set and the RS bit is set. In one embodiment, a "single-thread sync" may be defined as a synchronizing instruction or operation affecting a single thread of execution. This forms a memory barrier whereby all stores that are older than the single-thread sync have completed to the point that if a thread has visibility to a store that is younger than the sync, then it is guaranteed that the thread also has visibility to a store that is older than the sync. In one embodiment, the processor 102 and the store queue 114 typically work together to make this happen. It is common for a processor to stop issuing instructions following a synchronizing operation until the store queue indicates that all older stores are visible to the coherency domain. In one embodiment, the store queue does not need to be concerned with stores from thread-X that follow a single-thread sync for thread-X because the processor will stop issuing new instructions behind a sync from the same thread until it knows that all older stores for that thread have completed. Otherwise, if this blocking of issuing new instructions behind the sync did not occur, then the store queue would need to know, when setting the Hptr, whether a new store's address matches a store that was older or younger than a single-thread sync in the store queue. In one embodiment, other threads sharing the same store queue do not need to block issue when a thread issues a single-thread sync. However, those threads depend upon the RS bits of stores that are older than the sync, because, although they are not dependent upon the completion of the sync, they do need to be ordered behind stores to the same address that are older than the sync. In an alternate embodiment, the processor blocks issue of all threads after any thread issues a sync. For single-thread syncs and all-thread syncs, the hazard pointer 314 does not matter. As indicated above, a hazard exists when the store queue entry 300 and another store queue entry are destined for the same memory address. The store queue entry 300 also includes a hazard pointer (Hptr) 314 that points to a store queue entry with a store that needs to retire before the store of store queue entry 300. In one embodiment, for regular stores, the hazard pointer 314 is written with an encoded value of the most recent entry (e.g., have a set RS) having a line match. The store queue entry 300 also includes a byte enable field (BE) 316 that indicates which bytes of the data field contain actual data to be stored, and a data field (Data) 318 that includes the data associated with the store.

Figure 4:
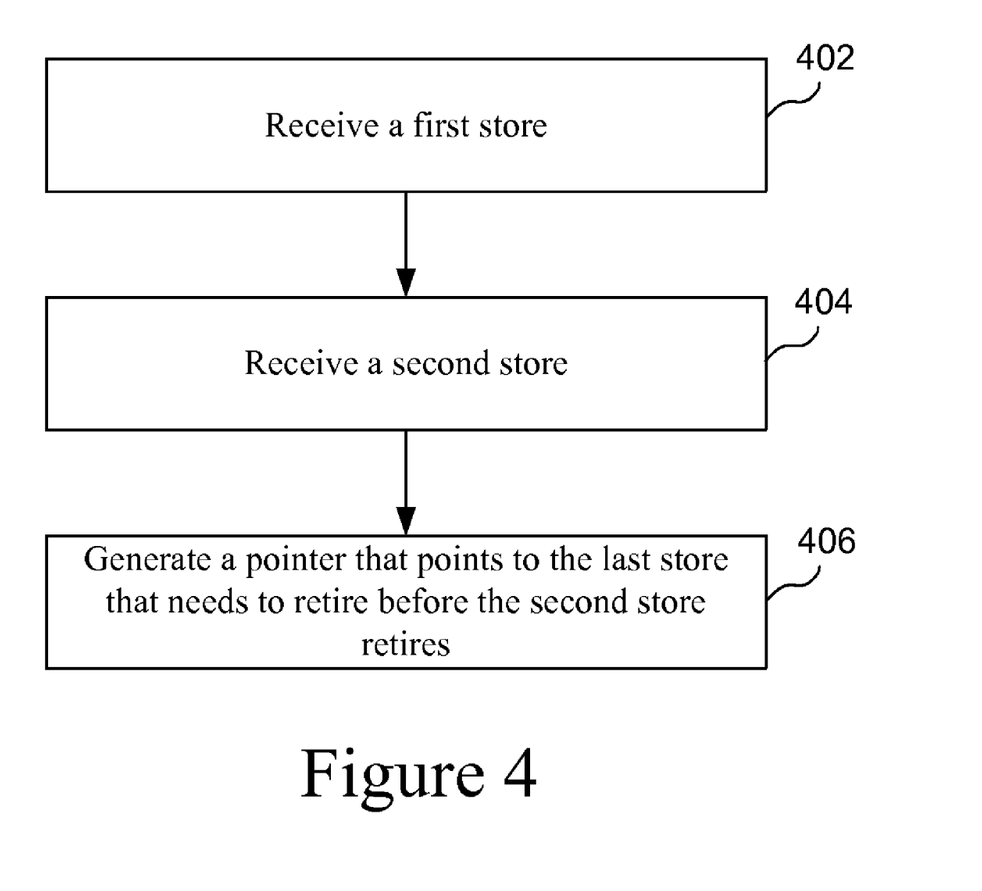
FIG. 4 is a flow chart showing a method for processing data in accordance with one embodiment of the present invention.

FIG. 4 is a flow chart showing a method for processing data in accordance with one embodiment of the present invention. Referring to FIGS. 1, 2, 3, and 4 together, the process begins when store queue 114 receives from processor 102 a first store in step 402 and subsequently receives a second store in step 404. In one embodiment, each store is associated with a hazard pointer that points 314 to the last store that needs to retire before the store can retire. Each store is also associated with a hazard bit that indicates if a hazard exists. Next, in step 406, the entry control unit 206 generates a pointer that points to the last store that needs to retire before the second store retires, where the pointer is associated with the second store, and the last store that needs to retire is the first store.

Figure 5:
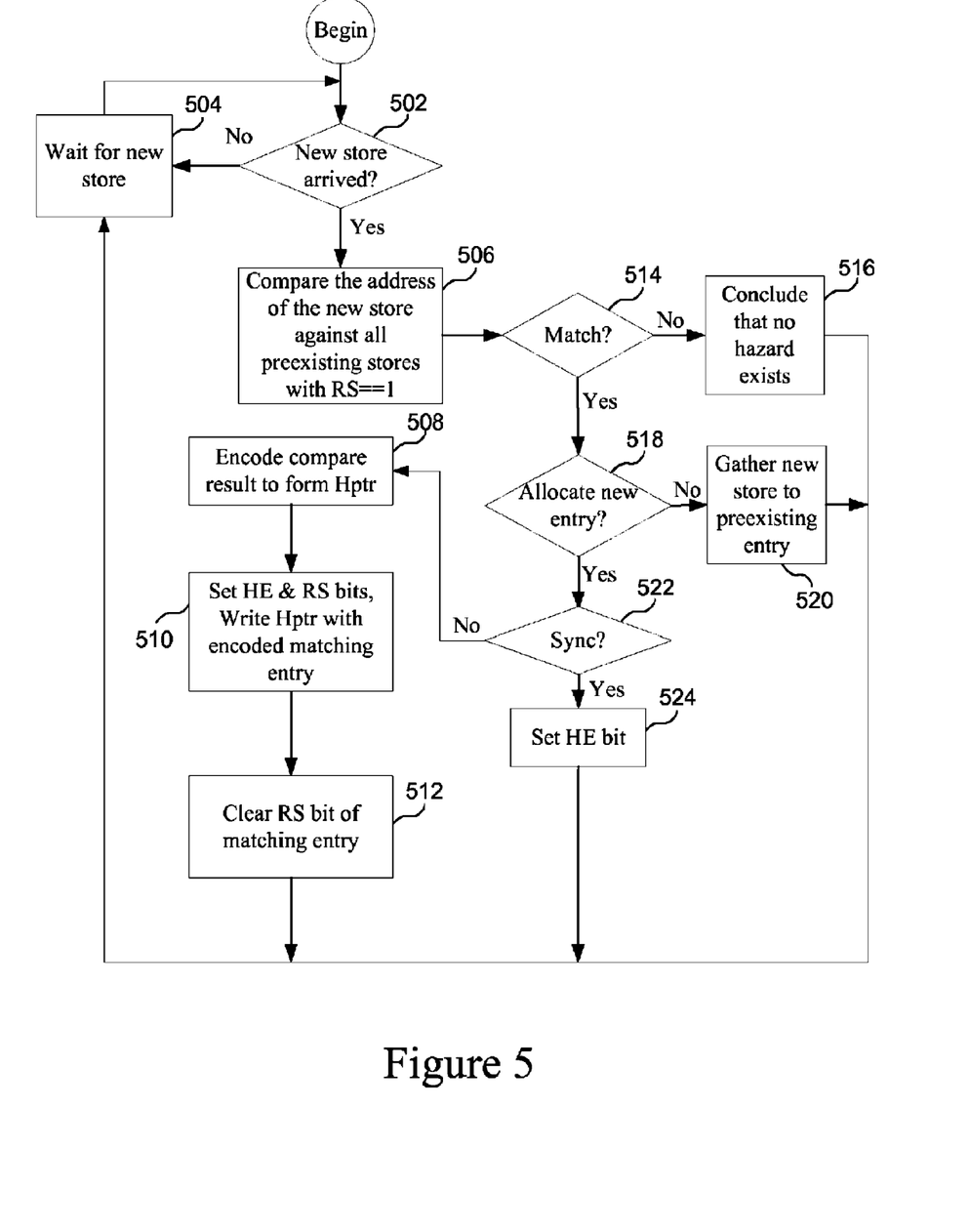
FIG. 5 is a flow chart showing a method for setting up dependency tracking upon a new entry allocation in accordance with one embodiment of the present invention.

FIG. 5 is a flow chart showing a method for setting up dependency tracking upon a new entry allocation, in accordance with one embodiment of the present invention. Referring to both FIGS. 1 and 5 together, the process begins in step 502 where the store queue 114 determines if a new store has arrived. If not, in step 504, the store queue 114 waits for a new store. Next, in step 506, the store queue 114 compares the address of the new store against all preexisting, valid store queue entries having an RS bit=1. Note that a synchronizing operation does not typically have a target address associated with it. It is always considered to have an address match with an entry in the store queue.

In step 514, the store queue 114 determines if there are any matches from step 506. If not, in step 516, the store queue 114 concludes that no hazard exists. This causes the store queue 114 to allocate a new entry, to set the RS bit for that entry, to not set the HE bit for that entry, and to not affect the RS bits of any other entries. The store queue 114 then waits for a new store (step 504). If there are any matches from step 506, in step 518, the store queue 114 determines if the store queue 114 needs to allocate a new entry. If not, in step 520, the store queue 114 gathers the new store with the preexisting, matching entry. Next, in step 504, the store queue 114 waits for a new store.

If the store queue 114 needs to allocate a new entry, in step 522, the store queue 114 determines if the request is associated with a synchronizing operation. If not, the store queue 114 proceeds to step 508, where it encodes the compare result from the step 506 to generate an Hptr value. Next, in step 510, the store queue 114 sets the HE and RS bits and writes the Hptr value with the encoded (youngest) matching entry. Next, in step 512, the store queue 114 clears the RS bit of the matching entry. The store queue 114 then waits for a new store.

If the request is associated with a synchronizing operation, in step 524, the store queue 114 sets the HE bit.

Figure 6:
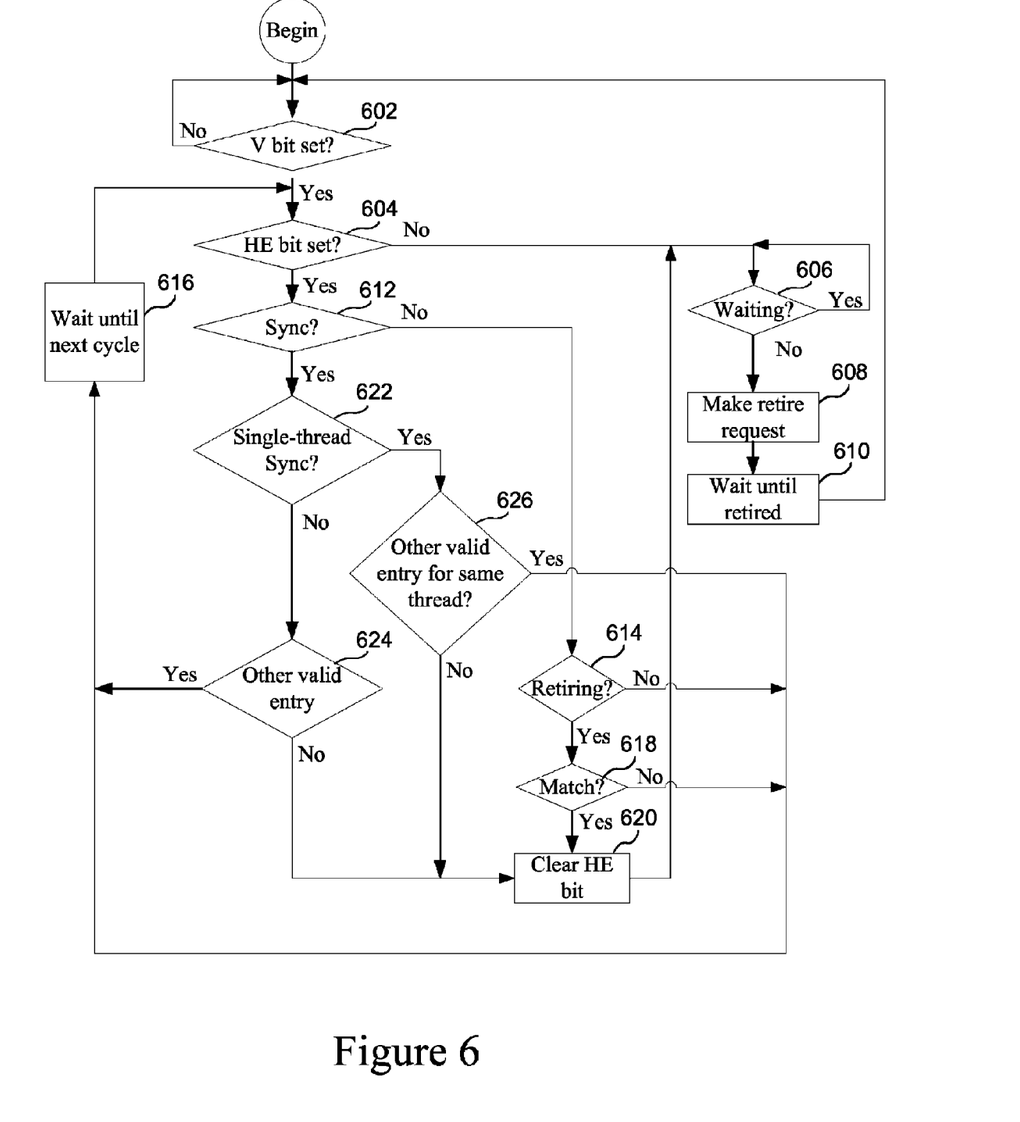
FIG. 6 is a flow chart showing a method for determining when an entry may retire in accordance with one embodiment of the present invention.

FIG. 6 is a flow chart showing a method for determining when an entry may retire, in accordance with one embodiment of the present invention. Referring to both FIGS. 1 and 6 together, the process begins in step 602 where the store queue 114 of the processor 102 determines if the entry is valid and contains an unretired store (i.e. V bit is set). Next, if the V bit is set in step 604, the store queue 114 determines if the HE bit is set.

If the HE bit is not set, in step 606, the store queue 114 determines if it is waiting to gather any new stores. If not, in step 608, the store queue 114 makes a retire request for the entry. In step 610, the store queue 114 waits for the entry to retire. If the HE bit is set, in step 612, the store queue 114 determines if the entry is a sync. If not, in step 614, the store queue 114 determines if a store is retiring this cycle. If not, in step 616, the store queue 114 waits until the next cycle.

If a store is retiring this cycle, in step 618, the store queue 114 determines if the entry number of the retiring store matches the Hptr for this entry. If not, the store queue 114 waits until the next cycle (616). If there is a match, in step 620, store queue 114 clears the HE bit and then continues with step 606.

Referring again to step 612, if the entry is a sync, in step 622, the store queue 114 determines if the entry is a single threaded sync. If not, the store queue 114, in step 624, determines if there are any other valid entries in the store queue. If so, the store queue 114 waits until the next cycle (616). If not, the store queue 114 continues with step 620.

Referring again to step 622, if the entry is a single-thread sync, in step 626, the store queue 114 determines if there are other valid entries for the same thread. If so, the store queue 114 waits until the next cycle (616). If not, the store queue 114 continues with step 620.

According to the method and system disclosed herein, the present invention provides numerous benefits. For example, each store queue entry carries a hazard pointer and valid bit instead of a dependency vector. For a 32 entry store queue, the dependency vector scheme needs 1024 latches while a pointer-based scheme as described herein may need only 224 latches ((5b Hptr+1b HE+1b RS)*32 entries) to track the store ordering hazards. This saves much area and power because latches tend to be quite large relative to other boolean gates (e.g., AND gate).

Also, embodiments described herein are scalable. For example, if the number of entries in the store queue doubles, then the number of latches needed to track the store ordering hazards only slightly more than doubles. (The number of pointers would double, and each pointer would grow by 1 bit.) In the dependency-vector-based scheme, doubling the number of store queue entries causes the number of dependency tracking latches to quadruple.

For larger store queue sizes, such as 32 entries, embodiments described herein are able to more quickly determine whether a store has any dependencies remaining, because there would be no need to perform a large reduction OR in the processor cycle after the last dependency bit was cleared. In the pointer scheme, when the store that is being waited on retires, the hazard pointer valid bit (HE) would be cleared instead of clearing a dependency vector bit. At the next cycle, there is no reduction OR to perform (as in the dependency vector scheme). Rather, a valid bit latch indicates (HE=0) whether the hazard has been resolved.

Further, embodiments save power by only performing the hazard compares of new stores versus older stores that have their RS bit set. Because each cache line address that is represented in the store queue at a given time can only have 1 entry with an RS bit set, and because that entry must be the youngest for that address, there is no need to compare against other entries for that cache line.

A method and system in accordance with the present invention for processing data has been disclosed. The method includes receiving multiple stores. Each store is associated with a hazard pointer that points to the last store that needs to retire before the store can retire. Each store is also associated with a hazard valid bit that indicates if a hazard exists. A hazard exists when two or more stores are destined to the same address. As a result, a need for a dependency vector is eliminated.

The present invention has been described in accordance with the embodiments shown. One of ordinary skill in the art will readily recognize that there could be variations to the embodiments, and that any variations would be within the spirit and scope of the present invention. For example, embodiments of the present invention may be implemented using hardware, software, a computer-readable medium containing program instructions, or a combination thereof. Software written according to the present invention or results of the present invention may be stored in some form of computer-readable storage device such as memory, hard drive, CD-ROM, DVD, or other storage devices for subsequent purposes such as being executed or processed by a processor, being displayed to a user, etc. Also, software written according to the present invention or results of the present invention may be transmitted in a signal over a network. In some embodiments, a computer-readable medium may include a computer-readable signal that may be transmitted over a network. Accordingly, many modifications may be made by one of ordinary skill in the art without departing from the spirit and scope of the appended claims.

What is claimed is:

1. A method comprising:
   receiving a first store;
   thereafter, placing the first store in a first entry in a store queue for a memory, wherein the first store includes a memory address;
   comparing the memory address for the first store with only memory addresses for a set of entries in the store queue that have a recent store bit set, wherein the recent store bit indicates that a store is a most recent entry for a particular memory address and wherein the set of entries in the store queue that have the recent store bit set are a youngest store of each memory address included in all entries in the store queue;
   determining that the memory address for the first store matches a matching memory address for a second store in the set of entries in the store queue that have the recent store bit set; and
   thereafter, setting a hazard bit and a first recent store bit in the first entry, clearing a second recent store bit in a second entry in the store queue for the second store to form only one entry in the store queue for the memory address that has the recent store bit set, and including a pointer in the first entry that points to the second entry, wherein the second store is a last store that needs to retire before the first store retires.

2. The method of claim 1 further comprising:
   generating a linked list that includes a plurality of pointers that point to a plurality of respective stores that are destined for a same address.

3. The method of claim 1 further comprising:
   generating a linked list that includes a plurality of pointers that point to a plurality of respective stores that are destined for a same address, wherein the plurality of stores retires in an order based on the plurality of pointers.

4. The method of claim 1 further comprising:
   generating a linked list that includes a plurality of pointers that point to a plurality of respective stores that are destined for a same address, wherein the plurality of stores retires in an order based on the plurality of pointers; and
   adding the pointer in the first entry that points to the second store to the plurality of pointers in the linked list.

5. The method of claim 4, wherein the linked list is a first linked list and further comprising:
   generating a second linked list that includes a plurality of second pointers that point to a plurality of respective stores that are destined for a same second address.

6. The method of claim 1 further comprising:
   detecting the second store retiring; and
   thereafter, clearing the hazard bit in the first entry, wherein only entries in the store queue that do not have the hazard bit set can be retired.

7. The method of claim 1 further comprising:
   clearing a valid bit field in the first entry when the first store retires.

8. A computer-readable storage device storing program instructions which when executed by a computer system cause the computer system to execute a method comprising:
   receiving a first store
   thereafter, placing the first store in a first entry in a store queue for a memory, wherein the first store includes a memory address;
   comparing the memory address for the first store with only memory addresses for a set of entries in the store queue that have a recent store bit set, wherein the recent store bit indicates that a store is a most recent entry for a particular memory address and wherein the set of entries in the store queue that have the recent store bit set are a youngest store of each memory address included in all entries in the store queue;
   determining that the memory address for the first store matches a matching memory address for a second store in the set of entries in the store queue that have the recent store bit set; and
   thereafter, setting a hazard bit and a first recent store bit in the first entry, clearing a second recent store bit in a second entry in the store queue for the second store to form only one entry in the store queue for the memory address that has the recent store bit set, and including a pointer in the first entry that points to the second entry, wherein the second store is a last store that needs to retire before the first store retires.

9. The computer-readable storage device of claim 8 further comprising program instructions for generating a linked list that includes a plurality of pointers that point to a plurality of respective stores that are destined for a same address.

10. The computer-readable storage device of claim 8 further comprising program instructions for generating a linked list that includes a plurality of pointers that point to a plurality of respective stores that are destined for a same address, wherein the plurality of stores retires in an order based on the plurality of pointers.

11. The computer-readable storage device of claim 8 further comprising program instructions for:
   generating a linked list that includes a plurality of pointers that point to a plurality of respective stores that are destined for a same address, wherein the plurality of stores retires in an order based on the plurality of pointers; and adding the pointer in the first entry that points to the second store to the plurality of pointers in the linked list.

12. The computer-readable storage device of claim 11, wherein the linked list is a first linked list and further comprising program instructions for:

generating a second linked list that includes a plurality of second pointers that point to a plurality of respective stores that are destined for a same second address.

13. The computer-readable storage device of claim 8 further comprising program instructions for:

detecting the second store retiring: and thereafter, clearing the hazard bit in the first entry, wherein only entries in the store queue that do not have the hazard bit set can be retired.

14. The computer-readable storage device of claim 8 further comprising program instructions for:

clearing a valid bit field in the first entry when the first store retires.

15. A system comprising:

a processor; and a store queue for a memory, the store queue operably connected to the processor, wherein the processor is configured to:

place a first store in a first entry in the store queue, wherein the first store includes a memory address in response to receiving the first store;

compare the memory address for the first store with only memory addresses for a set of entries in the store queue that have a recent store bit set, wherein the recent store bit indicates that a store is a most recent entry for a particular memory address and wherein the set of entries in the store queue that have the recent store bit set are a youngest store of each memory address included in all entries in the store queue;

determine that the memory address for the first store matches a matching memory address for a second store in the set of entries in the store queue that have the recent store bit set; and thereafter, set a hazard bit and a first recent store bit in the first entry, clear a second recent store bit in a second entry in the store queue for a second store to form only one entry in the store queue for the memory address that has the recent store bit set, and include a pointer in the first entry that points to the second entry, wherein the second store is a last store that needs to retire before the first store retires.

16. The system of claim 15, wherein the processor is further configured to generate a linked list that includes a plurality of pointers that point to a plurality of respective stores that are destined for a same address.

17. The system of claim 15, wherein the processor is further configured to:

generate a linked list that includes a plurality of pointers that point to a plurality of respective stores that are destined for a same address, wherein the plurality of stores retires in an order based on the plurality of pointers.

18. The system of claim 15, wherein the processor is further configured to:

generate a linked list that includes a plurality of pointers that point to a plurality of respective stores that are destined for a same address, wherein the plurality of stores retires in an order based on the plurality of pointers; and add the pointer in the first entry that points to the second store to the plurality of pointers in the linked list.

19. The system of claim 18, wherein the linked list is a first linked list and, wherein the processor is further configured to generate a second linked list that includes a plurality of second pointers that point to a plurality of respective stores that are destined for a same second address.

20. The system of claim 15, wherein the processor is further configured to:

detecting the second store retiring; and thereafter, clear the hazard bit in the first entry, wherein only entries in the store queue that do not have the hazard bit set can be retired.

* * * * *